(12) United States Patent
Chen et al.

(10) Patent No.: US 9,338,061 B2
(45) Date of Patent: May 10, 2016

(54) OPEN STATION AS A STREAM ANALYSIS OPERATOR CONTAINER

(75) Inventors: Qiming Chen, Cupertino, CA (US); Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 507 days.

(21) Appl. No.: 13/457,449

(22) Filed: Apr. 26, 2012

(65) Prior Publication Data
US 2013/0290554 A1    Oct. 31, 2013

(51) Int. Cl.
*G06F 15/16*    (2006.01)
*H04L 12/24*    (2006.01)

(52) U.S. Cl.
CPC ...................................... *H04L 41/14* (2013.01)

(58) Field of Classification Search
USPC ........... 709/231, 224, 227; 370/389, 254, 382
See application file for complete search history.

(56) References Cited

U.S. PATENT DOCUMENTS

| | | | | |
|---|---|---|---|---|
| 6,499,036 B1 * | 12/2002 | Gurevich | ............. | G06F 9/4435 707/778 |
| 7,164,688 B2 * | 1/2007 | Grimbergen | ............ | H04J 3/062 370/382 |
| 7,367,226 B2 * | 5/2008 | Okamura | .............. | G01F 23/284 250/357.1 |
| 7,430,261 B2 * | 9/2008 | Forest et al. | ................... | 375/364 |
| 7,448,048 B1 * | 11/2008 | Nesamoney et al. | ......... | 719/318 |
| 7,523,462 B1 * | 4/2009 | Nesamoney et al. | ......... | 719/318 |
| 7,586,953 B2 * | 9/2009 | Forest et al. | .................. | 370/503 |
| 7,788,409 B2 * | 8/2010 | Doumuki | ............ | H04L 12/2805 370/254 |
| 7,818,417 B2 * | 10/2010 | Ginis et al. | ..................... | 709/224 |
| 7,969,974 B2 * | 6/2011 | Arango | .................... | H04B 1/74 370/389 |
| 7,979,539 B2 * | 7/2011 | Dick et al. | ...................... | 709/224 |
| 8,019,632 B2 * | 9/2011 | Niheu et al. | ................. | 705/7.11 |
| 8,316,132 B2 * | 11/2012 | Pohjolainen | ......... | H04N 21/235 709/227 |
| 8,499,069 B2 * | 7/2013 | Ginis et al. | ..................... | 709/224 |
| 2004/0081079 A1 * | 4/2004 | Forest et al. | .................. | 370/216 |
| 2004/0081193 A1 * | 4/2004 | Forest et al. | .................. | 370/458 |
| 2004/0090962 A1 * | 5/2004 | Forest et al. | .................. | 370/392 |
| 2005/0141565 A1 * | 6/2005 | Forest et al. | .................. | 370/503 |
| 2007/0174233 A1 * | 7/2007 | Ginis et al. | ........................ | 707/2 |
| 2008/0120592 A1 * | 5/2008 | Tanguay et al. | ............... | 717/104 |
| 2008/0184262 A1 * | 7/2008 | Ginis et al. | ..................... | 719/314 |
| 2009/0327398 A1 * | 12/2009 | Campbell et al. | ............. | 709/202 |
| 2010/0293535 A1 * | 11/2010 | Andrade et al. | ............. | 717/156 |
| 2012/0137018 A1 * | 5/2012 | Uhlig et al. | .................... | 709/231 |
| 2013/0290554 A1 * | 10/2013 | Chen et al. | ..................... | 709/231 |
| 2014/0156806 A1 * | 6/2014 | Karpistsenko et al. | ........ | 709/219 |

OTHER PUBLICATIONS http://www.informatin-management.com/issues/20040201/8034-1.html; ATRE, S. et al.; Feb. 1, 2004; Real-time Analysis and Data Integration for BI.

* cited by examiner

*Primary Examiner* — Tammy Nguyen
(74) *Attorney, Agent, or Firm* — Rathe Lindenbaum LLP (57) ABSTRACT

An open station as a stream analysis operator container is disclosed. In an example, a method is stored as instructions on computer readable media and executable by a processor. The method includes packaging graph-structured stream transformations into a topology of a top-level dataflow process including stream transformation operators (STOs) on open stations. The method also includes sending a tuple from one of the STOs to every other STO in the topology subscribed to a data stream of the tuple.

18 Claims, 6 Drawing Sheets

OPEN STATION AS A STREAM ANALYSIS OPERATOR CONTAINER

BACKGROUND

Data streams provide enterprises the ability to monitor continually changing circumstances in real-time (e.g., based on data received from mobile devices, social media, and other sources). Processing this data in real-time allows enterprises to analyze business operations on an ongoing (and thus more relevant) basis. There is no (or minimal) lag between the data being generated/received, and the data being analyzed. Accordingly, enterprises may respond to business information promptly after the data is received.

Processing systems often execute tasks during analysis of data streams. These tasks transform the data streams. The tasks can be characterized as having certain properties in fixed categories. Encapsulating these properties as meta-data in the task itself is one way to ensure proper execution. However, encapsulating these properties as meta-data in the task itself can be tedious and is not system guaranteed.

DETAILED DESCRIPTION

As large volumes of real-time or substantially real time data becomes more readily available from mobile devices, social media and digitized data of all types, and across all industries, managing and analyzing streams of data in a continuous dataflow process enables users to understand and respond to issues affecting their business. The platform described herein is a real-time, continuous, parallel and elastic analytics platform, which supports the computation and caching of "moving" data. The output enables users to understand business intelligence on a fresh and relevant basis.

By way of example, a continuous data flow may be abstracted as a "stream". A stream is an unbounded sequence of tuples. The infrastructure described herein provides primitives for transforming the incoming data stream into a new stream in a distributed and reliable way. The basic primitives for handling the stream are with a Stream Source Operator (SSO) and a Stream Transformation Operator (STO). The SSO and STO operators have interfaces which may be implemented for different application-specific logic. Graph-structured stream transformations are packaged into a "topology," which is the top-level dataflow process made of SSOs and STOs. Edges in the graph indicate which STO are subscribing to which streams. When a SSO or STO emits a tuple to a stream, it sends the tuple to every STO that subscribed to that stream. A stream grouping tells a topology how to send tuples between two components.

SSOs and STOs may be executed as many threads in parallel across a processing cluster, and pass messages to each other in a distributed way. Messages never pass through any sort of central router, and there are no intermediate queues. That is, a tuple is passed directly from the thread which created the tuple, to the threads that need to consume the tuple.

In a data streaming topology such as this, tasks can be implemented by any program for the designated stream transformation. However, under the stream abstraction, the tasks have certain characteristics in several typical categories, such as the provisioning of initial data, the granularity of event processing, memory context, invocation patterns, results grouping and shuffling, etc. These may be considered meta-data, or the design pattern of tasks. Categorizing the common classes of task characteristics and supporting these tasks automatically and systematically can simplify the effort and enhance the quality of streaming application development.

The techniques described herein introduce the notion of open-station as the container of a task, in the sense that a STO is stationed on the open-station with the specified STO characteristics captured as the station properties. Specifically, an STO may be stationed (or contained) in a station. A station is a Java object. A STO is a method of the corresponding station object. The characteristics of a STO are the properties of that station, which are related to, but different from the application logic of the STO. Introducing the open-station raises the level of abstraction in coding streaming tasks, which significantly simplifies the effort and enhances the quality of streaming application development.

It is noted that the term "container" is used herein with system support, wherein the system functions defined in the container are used in executing the task. "Open" means the stations can be extended in the OO sense to form a station hierarchy, and the system function defined in stations invoke abstract functions to be implemented by task developers which is a way for the application logic to be "plugged in."

Open stations are specified as an object of a class, with the task properties specified as abstracted methods. Characteristics of open stations may include, but are not limited to: input/output (I/O) characteristics, caching characteristics, invocation characteristics, and grouping characteristics. During execution, an STO is stationed on the open-station with the specified characteristics for initiation during stream processing. Open stations can be extended by subclassing.

By using open stations, multiple queries may be used to express complex data flows, and model a graph-structured data flow by composing multiple queries. Accordingly, the system can support more scalable and elastic parallel computation than more data-intensive computation platforms. The system described herein also extends underlying tools from a computation infrastructure to a state-conscious computation/caching infrastructure. As such, the system supports truly continuous operations, provides computation support, adds the power of state caching, and supports patterns of operations automatically.

As will become apparent from the following discussion and examples, the system described herein may be characterized as a "real-time" and "continuous" stream processing platform, with the capability of parallel and distributed computation on real-time and potentially infinite streams of data (e.g., messages, events and signals). The system is also characterized as "topological" and "elastic," because the system can handle complex, graph-structured dataflow that is scaled-out over a grid of computers used for parallel computing.

Before continuing, it is noted that as used herein, the terms "includes" and "including" mean, but is not limited to, "includes" or "including" and "includes at least" or "including at least." The term "based on" means "based on" and "based at least in part on."

Figure 1:
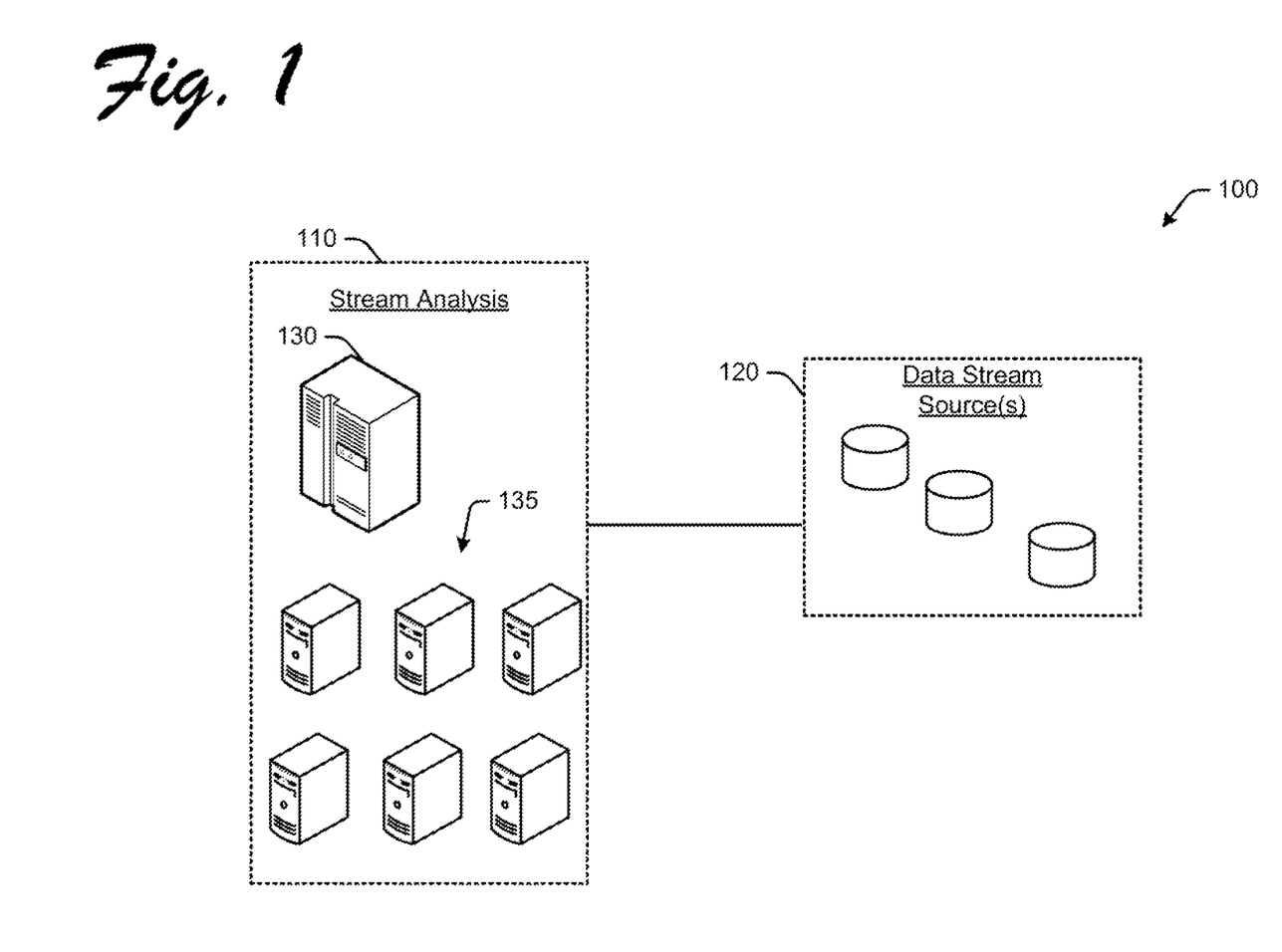
FIG. 1 shows an example system which may implement an open station as a stream analysis operator container.

FIG. 1 shows an example system 100 which may implement an open station as a stream analysis operator container. In an example, the system 100 may include a computing cluster 110 for analysis of data stream(s) from one or more source 120.

The computing cluster 110 may implement two types of compute nodes: a master node 130, and worker nodes 135. The master node 130 runs a daemon responsible for job tracking, including distributing code around the computing cluster, assigning tasks to machines, and monitoring for failures. Each worker node 135 runs a daemon that listens for work assigned to the corresponding machine, and starts/stops worker processes as necessary based on what has been assigned.

Each worker node 135 process executes a subset of a topology. A running topology includes many worker processes spread across many machines. The topology may be constructed using any of several open-source tools, such as but not limited to, ZooKeeper, ØMQ, Kryo, and Storm. ZooKeeper is a distributed, open-source coordination service for distributed applications. The service exposes a simple set of primitives that distributed applications can build on to implement higher level services for synchronization, configuration maintenance, groups, and naming. The service uses a data model styled after the familiar directory tree structure of file systems.

ØMQ is a super-socket system for building messaging systems. ØMQ is an embeddable networking library that acts as a concurrency framework for light-weight message delivery. Sockets carry whole messages across various transports, such as, but not limited to, in-process, inter-process, TCP, and multicast. Sockets can be connected N-to-N with patterns such as fan-out, pub-sub, task distribution, and request-reply. Execution is sufficiently fast to be the fabric for clustered products. The asynchronous I/O model provides scalable multicore applications, built as asynchronous message-processing tasks.

Kryo is a fast and efficient object graph serialization framework. The serializer interface defines methods to read and write objects to and from bytes. Serializer implementations are included for all types of objects, such as primitives, arrays, strings, enums, collections, maps, and beans. The serializer methods writeObject/readObject can be used to read and write objects that may be null. By way of example, first a byte is written to indicate if the object is null, and then the object's bytes are written. The Kryo instance can be used to automatically read and write objects in different ways. Once registered, the object serialization and de-serialization can be made across-machine nodes.

Storm provides the basic topology support for data flows, such as the sources and operators of stream data, links between the sources and operators, and the way to group results of predecessor operators in sending them to the successor operators.

The system infrastructure described herein provides the primitives for transforming a stream into a new stream in a distributed and reliable way. A stream is an unbounded sequence of tuples. The basic primitives for handling streaming are Stream Source Operator (SSO) and Stream Transformation Operator (STO). SSO and STO have interfaces which can be implemented for different application-specific logic.

Graph-structured stream transformations are packaged (e.g., components are linked together) into a "topology" which is the top-level dataflow process made of SSOs and STOs. Edges in the graph indicate the STO are subscribing to corresponding streams. When a SSO or STO emits a tuple to a stream, the tuple is sent to every STO that subscribed to that stream.

SSOs and STOs may execute as many threads in parallel across the cluster 135, and pass messages to each other in a distributed way. Messages do not pass through any sort of central router, and there are no intermediate queues. A tuple is passed (e.g., through messaging, such as zeroMQ or ØMQ) from the thread which created the tuple to the threads consuming the tuple. Message delivery is supported by ØMQ.

A stream grouping informs a topology how to send tuples between two components. There are different types of stream groupings. The simplest grouping is referred to as a "shuffle grouping." A shuffle grouping sends the tuple to a random task, and has the effect of evenly distributing the work of processing the tuples across all of the consecutive downstream tasks. A "fields grouping" ensures the tuples with the same value of a given field go to the same task. Fields groupings are implemented using consistent hashing. Other types of groupings may also be defined.

To support graph-structured data streaming applications, the system may implement streaming process. A streaming process represents a continuous dataflow application at the process level by multiple continuous operations (STOs), which form sequential, concurrent or nested steps. The result-set of a STO at a step, becomes the data source of the successor STOs. An STO is defined as a method in a station class; the object of that class may also keep a state across the executions of the STO on the sequence of input stream data elements.

Figure 2:
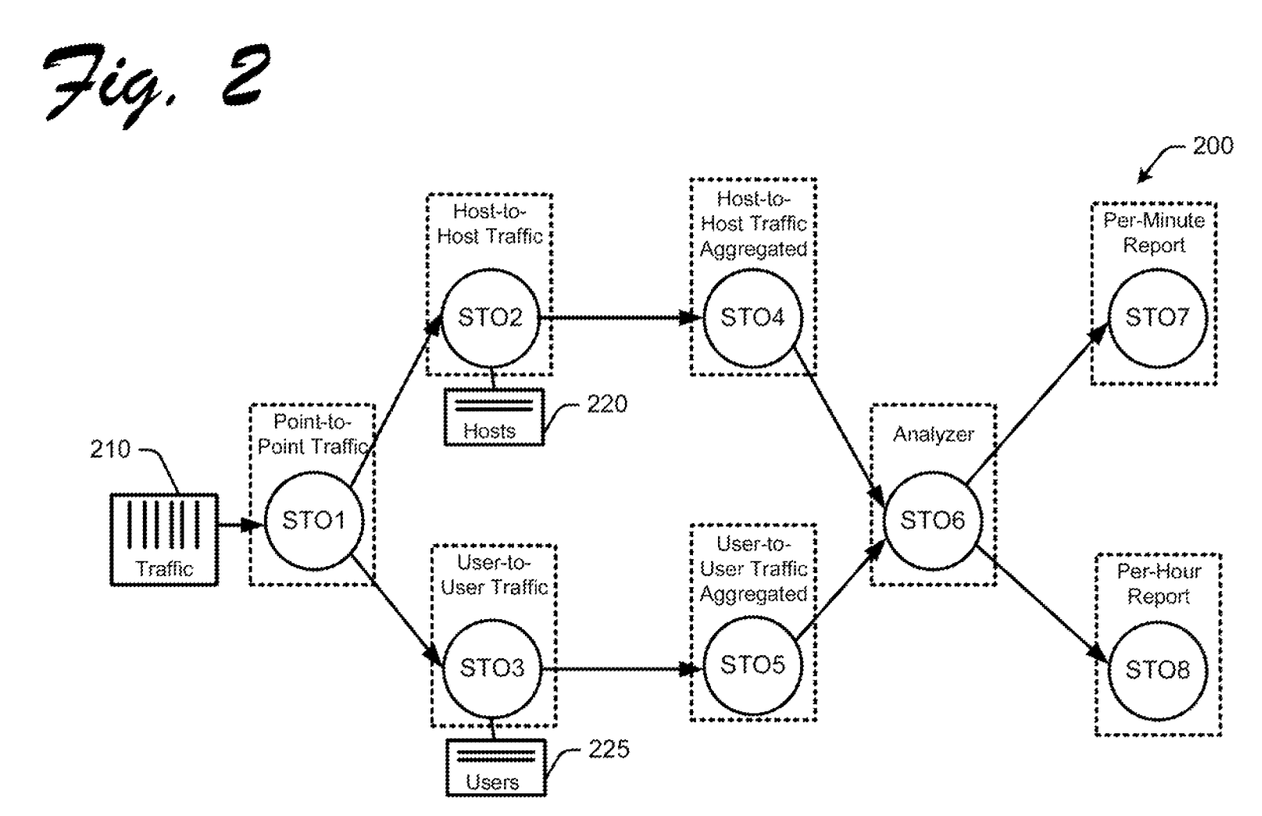
FIG. 2 is a process flow diagram illustrating an example system executing a streaming process for network traffic analysis.

FIG. 2 is a process flow diagram 200 illustrating an example system executing a streaming process for network traffic analysis where STOs are pipeline cascaded. In this example, the network traffic records 210 are each identified (tid) as the source data, for example, as Traffic [tid, time, fromIP, toIP, bytes, . . . ]. The process executes the following tasks illustrated in FIG. 2:

STO1 captures IP to IP network traffic recodes with second based timestamps, and convert them to minute based tuples;
STO2 transforms the IP to IP network traffic to host-to-host traffic;
STO3 transforms the IP to IP network traffic to user-to-user traffic;
STO4 aggregates the per-minute host-to-host traffic volume;
STO5 aggregates the per-minute user-to-user traffic volume;
STO6 analyzes the traffic pattern based on the above aggregates; and
STO7 and STO8 generate two kinds of traffic analysis reports, one on minute basis and the other on hourly basis.

It is noted that all of these STOs may be running continuously, but are applied to the incoming stream granularly (e.g., chunk-wise). The information about hosts and users are stored in the database (e.g., IP-Host mapping table 220 and the IP-User table 225) and retrieved by the tasks needing this information.

In this streaming application example, task STO2 transforms the IP to IP network traffic to host-to-host traffic, and task STO3 transforms the IP to IP network traffic to user-touser traffic. To execute these tasks, the tasks retrieve the IP-Host mapping table 220 and the IP-User table 225. In an example, these tables are loaded initially (rather than accessing the database repeatedly against each input IP). This means that the container object of the task (referred to herein as a station), should be capable of caching the initial data object to be used across all (or a chunk of) the input tuples. Accordingly, any aggregation operator also should keep a state with an initial value, which can be carried on across multiple input tuples.

In the above example, some of the operators have definable semantics only if the input of a given operator is a bounded data set, such as a table or a chunk of stream data. Thus, if an operator (e.g., STO4, STO5, STO8) is aggregation oriented, the operator can only be completed on bounded data. To process unbounded stream data on a chunk-by-chunk basis, the chunking criteria may be provided.

Example pairs of operations are map-reduceable, for which the shuffling policy (grouping) is specified (e.g., in the topology specification such as a top-level Java program for a dataflow process). Some tasks can be executed by processing, and possibly accumulating the results, on the per input tuple basis. Some tasks may be block oriented and thus pool all of the input tuples first, in a chunk. Furthermore, tasks may return one tuple or a set of tuples out of one input (e.g., a tuple or a chunk).

By way of example, input granularities of the tasks, if not per-tuple (default), are listed below:

STO1: deliver tid, minute, from-ip, to-ip, bytes from Traffic flow [GRANULE: 60 seconds]

STO4: return host-to-host traffic volume aggregation per-minute [GRANULE: 1 minute, REDUCE GROUP KEY: from-host, to-host]

STO5: return user-to-user traffic volume aggregation per-minute [GRANULE: 1 minute, REDUCE GROUP KEY: from-host, to-host]

STO8: provide HourlyReport on the result of STO6 [INPUTMODE: BLOCK, GRANULE: 60 minutes]

The paces of dataflow with respect to the timestamps can be different at different operators, which is part of the task properties. For example, input tuples to STO1 may be time-stamped on a per-second basis, tuples from STO7 on a per-minute basis, and on a per-hour basis after STO8.

Although a data stream is unbounded, applications may need infinite data to be analyzed granularly. The difficulty of using one-time operations for stream processing is that such an operation is not definable on unbounded data because this data cannot return a complete result. Indeed, if the operation involves aggregation, a result may never be returned.

Accordingly, the system may cut the input stream data into a sequence of chunks, with each chunk representing a bounded data set on which an operation is definable. After processing a chunk of data, the operation is re-run for processing the next chunk of data. In this way, an STO is executed cycle-by-cycle to process the stream data chunk-by-chunk.

By way of illustration, the dataflow path including STO1, STO2, STO4 in the above network traffic analysis example can be considered as a sub-process. First, a regular one-time execution defined on a bounded snapshot of the traffic flow data is maintained in the table "traffic_table." The one-time process, PA, is defined on bounded input data only, otherwise the SUM( ) operation cannot be completed and therefore the task is unable to return a result.

Next, the following dataflow process, PB, includes a real-time stream data source that delivers a stream element with schema [tid, time, fromIP, toIP, bytes, . . . ]. PB treats the sequence of network traffic records as a stream instead of as a table.

The execution of PB on an infinite stream is made in a sequence of cycles, one on each of the stream chunks. To allow PB to apply to the stream data one chunk at a time, and to return a sequence of chunk-wise results, the input stream (the input data) is cut into one minute-based chunks (e.g., S0, S1, . . . Si, . . . ), such that the execution semantics of PB is defined as executing $P_A(Si)$ in sequence for all Si's in the stream source. A graphical representation of $P_A$ and $P_B$ is shown in FIG. 3.

Figure 3:
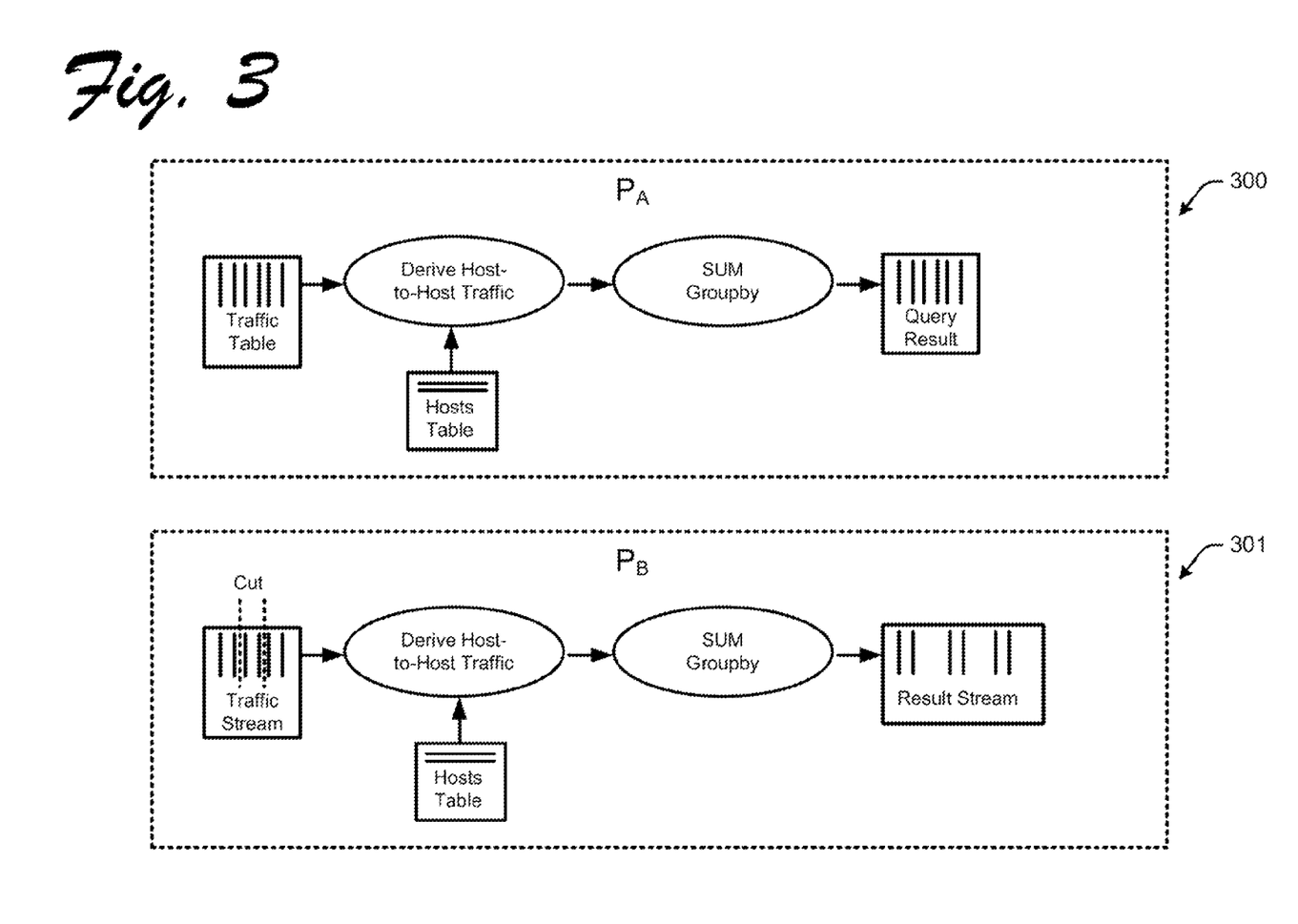
FIG. 3 is a process flow diagram illustrating an example system processing a static table ($P_A$) versus processing data stream chunk-by-chunk ($P_B$).

FIG. 3 is a process flow diagram illustrating an example system processing a static table ($P_A$) 300 versus processing data stream chunk-by-chunk ($P_B$) 301. To support a cycle-based STO for chunk-wise data processing, a mechanism punctuates the input stream based on the cycle specification, re-runs the chunk-wise results, and then rewinds the per-chunk based state of the STO for processing the next chunk of stream data in the next cycle. The global state is retained across execution cycles, such as those for keeping sliding windows. The system returns results on a cycle-by-cycle basis, while retaining the continuation of the sliding-window oriented history sensitive operations.

According to the above mechanism, an STO is running cycle-by-cycle and therefore referred to as Cycle-based STO (CSTO). In a Streaming Process, the default granule is one tuple. An STO with the default granule (and without aggregation) should not be executed as a CSTO. That is, it is not necessary to follow the cut-and-rewind mechanism. However, any STO on infinite stream input and involving aggregation (e.g., STO1, STO4, STO5, STO8 in the above example), should be defined as a CSTO, which is indicated by the chunking property. A CSTO continuously generates an unbounded sequence of results, one on each chunk of the stream data.

Figure 4:
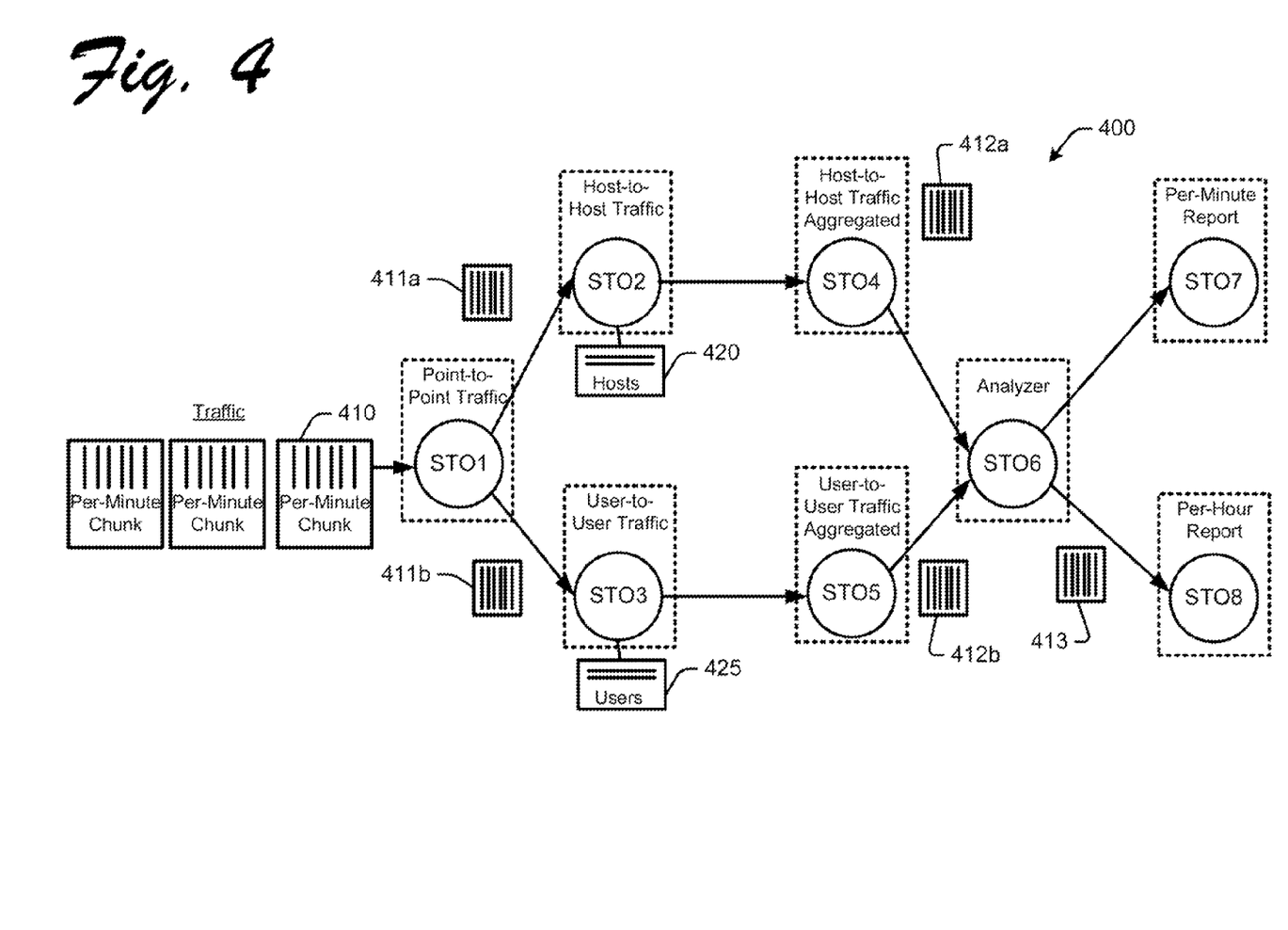
FIG. 4 is a process flow diagram illustrating an example system executing a streaming process for network traffic analysis.

FIG. 4 is a process flow diagram 400 illustrating an example system executing a streaming process for network traffic analysis made by stationed CSTOs running cycle-by-cycle for processing the stream data chunk-by-chunk. It is noted that 400-series reference numbers are used in FIG. 4 corresponding to the 200-series reference numbers used in FIG. 2.

In this example process, the STOs of STO1, STO4, STO5, STO8 are facilitated with STREAM_STO1( ), STREAM_STO4( ), STREAM_STO5( ), STREAM_STO8( ). STREAM_STO1( ) cuts the input stream 410 with second-based timestamps into 60 second chunks 411*a-b*. STREAM_STO4( ) and STREAM_STO5( ) cut input streams into one minute chunks 412*a-b*. STREAM_STO8( ) cuts the input stream into one hour chunks 413. These STOs run cycle-by-cycle to process the input data chunk-by-chunk.

The system also supports the data-parallel execution of one or more STOs connected sequentially. For example, in the above example streaming process, STO2 and STO4 can be treated as Map and Reduce operators. That is, STO2 and STO4 form sequential building blocks, but can be executed in parallel based on the Map-Reduce model as illustrated by the example shown in FIG. 5.

Figure 5:
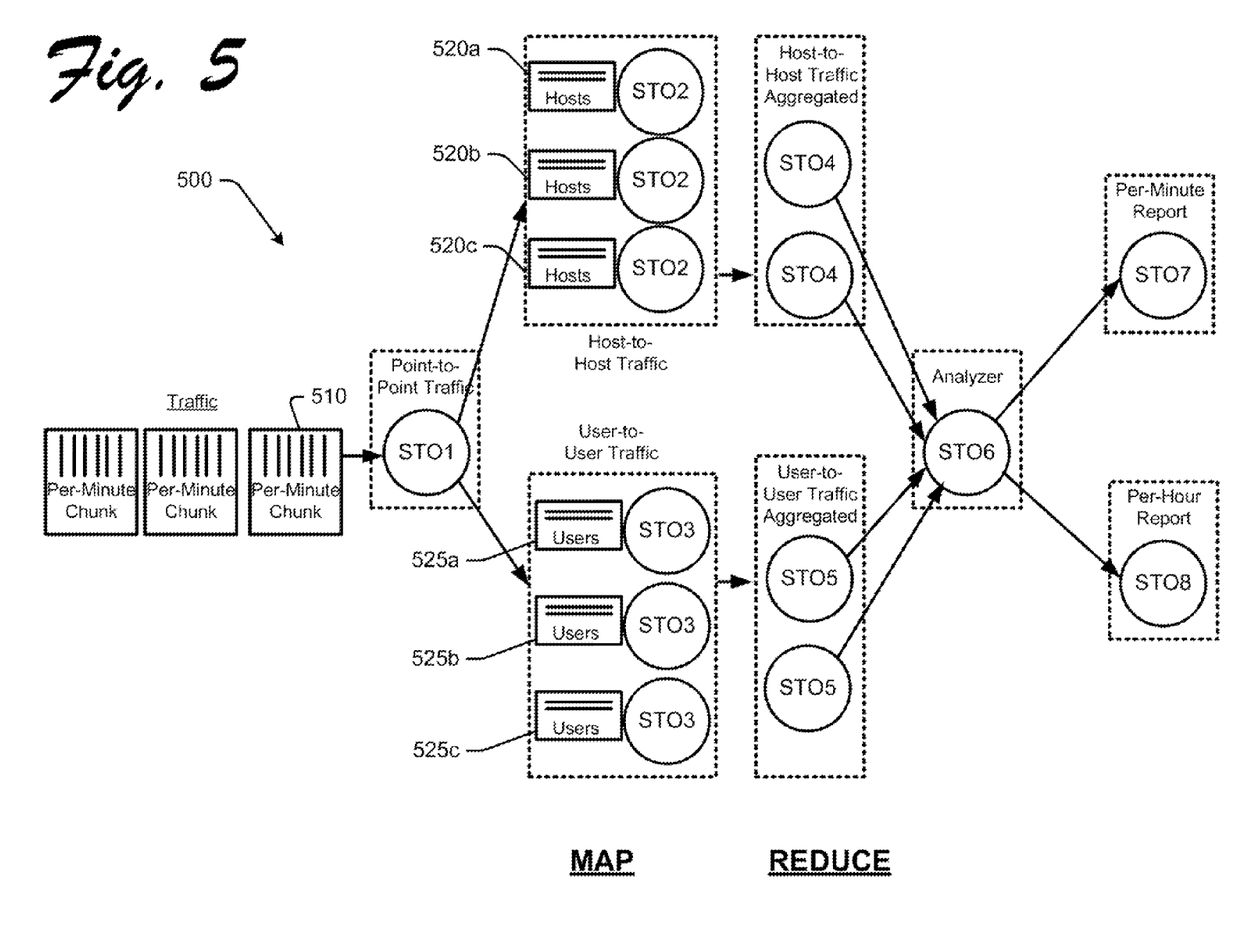
FIG. 5 is a process flow diagram illustrating an example system executing a streaming process planned and parallelized for data-parallel execution of sequential building blocks.

FIG. 5 is a process flow diagram 500 illustrating an example system executing a streaming process planed and parallelized for data-parallel execution of the sequential building blocks. It is noted that 500-series reference numbers are used in FIG. 5 corresponding to the 200-series reference numbers used in FIG. 2. For purposes of this illustration, the example is based on a Map-Reduce computation model. This data-parallel execution is planned and launched by the system based on the process specification.

To handle data-parallel operations, a task property may be specified, for example, as the number of threads for running the task (STO). The threads are judged by the infrastructure and load-balanced over multiple available machines (e.g., workers 135 in FIG. 1). Another property is the data grouping characteristics, which indicate how the results of the predecessor STOs are grouped and sent to the successor STOs. For example, hash-partition the map results to reduce is a group option.

In the network traffic flow example, the stream data are hash-partitioned across the map nodes. The map STOs are created based on STO2 by the system planner, where the results of aggregation are local subtotals. The reduce STOs from STO4 fuses the local aggregation results. Each map operation is punctuated every 60 seconds and runs cycle-by-cycle for providing minute-based partial aggregates. The map results are shuffled to the reduce sites after each execution cycle based on the network replicated hash-tables. Both map and reduce operations run in the per-minute cycle.

An STO (including a CSTO) may have PER_TUPLE and block input modes, with the default mode as PER_TUPLE. An STO (e.g., STO8) in the block mode means that results cannot be generated until reading in the whole relation or chunk (e.g., if a CSTO), which is orthogonal to chunking.

An STO may be provided for or contained in a station. A station can be implemented as an object (e.g., a Java object). The characteristics of the STO are the properties of the corresponding station, which are related to, but different from the application logic of the STO. The properties of a station are represented by the abstract methods specified on the station class.

The characteristics of STOs can be handled by specializing the STO station class with particular characteristics by subclassing the general STO station class. I/O characteristics specify the number of input tuples and the output tuples the STO is designed to handle. STOs with different I/O characteristics are sub-classed differently.

The system supports one input to one output, one input to N (multiple) outputs, M (multiple) inputs to one output, and M inputs to N outputs. Accordingly, STOs may be sub-classed into: Scalar STO (1:1); Set Return STO (1:N); Aggregate STO (N:1); and Set-in/Set-out STO (M:N) (also referred to as SISO STO). For a SISO STO, the chunking criteria is specified.

For a SISO STO, the chunking criteria is specified. The following chunking criteria may be supported for punctuating the input tuples: by cardinality (e.g., number of tuples); by granule as a function applied to an attribute value (e.g. identity (graph_id), get_minute (timestap_in_secord)). The subclasses for those types of STOs provide focused support to the memory contexts and invocation patterns, which is described later.

Blocking characteristics specify that in a multiple input case, the STO applies to the input tuple one by one incrementally (e.g., per-chunk aggregation), or first pools the input tuples and then applies the function to all the pooled tuples. Accordingly, the block mode can be per-tuple or blocking. Specifying the blocking model tells the system to invoke the STO in a designated way, and save the user's effort to handle STOs in the application program.

Caching characteristics is related to the different levels of cache states: (1) per-process state for the whole dataflow process with initial data objects; (2) per-chunk state for processing a chunk of input tuples with initial data objects; (3) per-input state for processing an input tuple possibly with initial data objects for multiple returns; and (4) per-return state for processing a returned tuple.

Invocation characteristics depend on the caching characteristics and are represented by the specific program structure and APIs (e.g. iterations, returns) in the corresponding STO station subclasses.

Grouping characteristics informs a topology how to send tuples between two components. The simplest stream grouping is a "shuffle grouping," which sends the tuple to a random task. Shuffle grouping has the effect of evenly distributing the work of processing the tuples across all of the consecutive downstream tasks. Fields grouping ensures the tuples with the same value of a given field go to the same task. Fields groupings are implemented using consistent hashing. Other groupings are also possible.

STO characteristics are represented by station properties. Applying an STO to the entire tuple set, chunk-by-chunk, or tuple-by-tuple, and returning a single tuple or a set of tuples, represents different invocation patterns and needs to maintain the STO execution states in different scopes. In pipelined stream processing, even a chunk of tuples is fed in one-by-one. In general, the execution state management and invocation pattern of an STO is determined by the way the input/output data is handled.

A stationed STO is called multiple times for processing the incoming stream elements. The initial data used in every call and the carry-on data across calls, are handled by the station object of the STO, that provides, in addition to the method for performing STO, the optional initialize method and finalize method. The initialize method is executed once prior to the first time the STO is called, in the specific stream processing context (e.g., over multiple input tuples or over multiple returned tuples) which provides initial data. The method for performing STO is executed for each stream input, therefore multiple such calls are executed if the function is called one tuple at a time. The finalize method is executed after the last STO call, for "cleanup" purposes. As such, memory spaces allocated for function execution may have different lifespans, or scopes (e.g., per-chunk or per-tuple of input).

To support STO characteristics, four levels of memory context (or buffer types) may be provided. These include: per-process (all input), per-chunk, per-tuple (input) and per-return. The per-process state is used for the function invocations throughout the dataflow process to process multiple chunks of input tuples. The per-process state retains the descriptor of returned tuples, and keeps track of the information about chunk switch, chunk-size, and the number of processed chunks. The per-process state holds the data structures used in chunk-wise processing to avoid repeatedly initiating these data structures, and holds the data initially buffered for processing every chunk or tuple, to avoid repeatedly loading this buffered data.

The per-process state sustains throughout the life-time of the dataflow process. The per-chunk state handles processing one chunk of input tuples. The per-tuple state maintains the information in processing one input tuple which may involve multiple calls for delivering multiple returns. The per-return state is associated with delivering one return tuple.

The system also supports several general chunking criteria. The criteria may include: chunking by cardinality based on the number of tuples, chunking by range such as time-window based on timestamps, and chunking by "object" based on the selected chunk-key attribute (a more generalized selection than timestamp). Ordering tuples based on timestamps or pre-grouping tuples based on chunk key may be used to support chunking.

The chunk boundary may be determined based on receipt of the first tuple of the next chunk, which is buffered for later use. For example, incoming tuples may be punctuated with timestamps every minute. After detection of a time window change, the buffered tuples are processed in batch. The end-of-chunk event for the current chunk may be captured on receipt of the first tuple of the next chunk. In this case, that tuple is not processed, but is buffered and later treated as the first tuple of the next chunk.

To ease users from the burden of dealing with system details, a "canonical" station-supported approach may be implemented. This approach codes the application logic in a single "user-function" rather than being mingled with system calls. In addition, the initial data (if any) is accessible as station variables.

STO may be coded with the application logic only, and the station handles I/O and cache characteristics. Accordingly, STO invocation may follow a pattern. The term "invocation pattern" is used herein to mean the method of handling input and output. By way of example, for N input tuples, an STO may be called once, N times, or even N×M times (if M tuples are returned for each input tuple).

Example invocation patterns may include, but are not limited to, scalar STO, table STO, and Set-In/Set-Out STO. A scalar STO invocation pattern is called multiple times; once for processing each single input tuple. In the initial call, the per-process state is established with certain data structures that can be shared, accessed and manipulated in subsequent calls. In the first call and each subsequent call, one tuple is processed and the per-process state may be referred and updated.

A table STO invocation pattern is applied to every input tuple, for processing a single tuple. The table STO is called one or more times for delivering a set of return tuples. A table STO initializes a state with respect to each input that is shared, accessed, and manipulated across the generation of multiple return tuples. For each STO call, one resulting tuple is returned.

A Set-In/Set-Out STO invocation pattern has a hybrid behavior, buffering and processing every N input tuples in a data chunk. For tuples 1 to N−1, the STO acts as a scalar function. With one call per input tuple, a table function returns NULL. For tuple N, the STO acts as a table function executed with multiple calls for multiple returns.

The Set-In/Set-Out STO invocation pattern is related to four levels of accessible states: per-process state, per-chunk state, per-tuple state, and per-return state. In the per-process initial call, the global context of chunk-wise function invocation is set up. The initial data, if any, is loaded and shared in processing all tuples. In the per-chunk state, the first call is for the one chunk based buffer for pooling data is set up. The initial data, if any, can be loaded and shared in processing the tuples in the chunk. The tuples of a chunk, (except for the last tuple in the chunk), may be pooled in the per-tuple calls with each call returning NULL.

On receipt of the last tuple in the chunk, the whole chunk of tuples is processed (e.g., using a procedural call), resulting in a materialized set (e.g., having M tuples). The Set-In/Set-Out STO is called M times (with M corresponding to the last tuple), in "last-tuple first-call," "last-tuple normal-call," and "last-tuple last-call." The first call and the last call are also normal calls, and extend the normal call functionality. Specifically, in the "last-tuple first-call," the last tuple in the chunk is pooled, the batch computation is performed on the whole data chunk, and the computation results are materialized. These tuples are returned one by one in the subsequent "last-tuple normal-calls." The "last-tuple last-call" may be used to advance chunk oriented tuple index and cleanup buffer.

Before continuing, it should be noted that the examples described above are provided for purposes of illustration, and are not intended to be limiting. Other devices and/or device configurations may be utilized to carry out the operations described herein.

Figure 6:
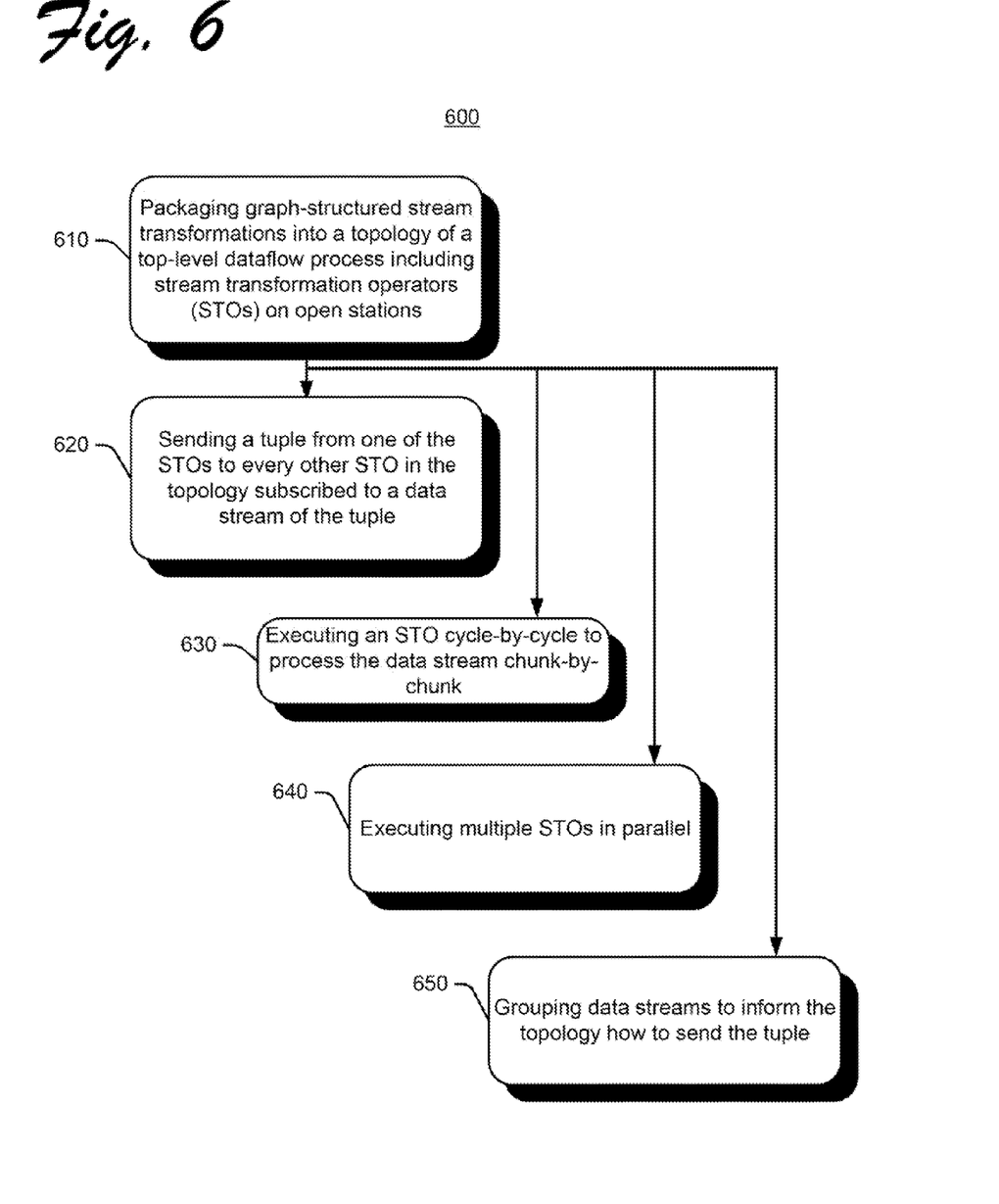
FIG. 6 is a flowchart illustrating example operations which may implement an open station as a stream analysis operator container.

FIG. 6 is a flowchart illustrating example operations which may implement an open station as stream analysis operator container. Operations 600 may be embodied as logic instructions on one or more computer-readable medium. When executed on a processor, the logic instructions cause a general purpose computing device to be programmed as a special-purpose machine that implements the described operations. In an example, the logic instructions may be implemented as program code. In an example, the program code may be implemented in machine-readable instructions (such as but not limited to, software or firmware). The machine-readable instructions may be stored on a non-transient computer readable medium and are executable by one or more processor to perform the operations described herein. The program code executes the function of the architecture of machine readable instructions as self-contained modules. These modules can be integrated within a self-standing tool, or may be implemented as agents that run on top of an existing program code. However, the operations described herein are not limited to any specific implementation with any particular type of program code.

Operation 610 includes packaging (e.g., linking components together) graph-structured stream transformations into a topology of a top-level dataflow process including stream transformation operators (STOs) on open stations. Edges in the graph may identify STOs subscribed to the data stream.

Operation 620 includes sending a tuple from one of the STOs to every other STO in the topology subscribed to a data stream of the tuple. The data stream may be an unbounded sequence of tuples.

The operations shown and described herein are provided to illustrate example implementations. It is noted that the operations are not limited to the ordering shown. Still other operations may also be implemented.

Further operations may include at 630 executing an STO cycle-by-cycle to process the data stream chunk-by-chunk. Processing the data stream chunk-by-chunk may be by cutting the data stream into a sequence of chunks, with each chunk representing a bounded data set on which an operation is defined, and after processing a chunk of the data stream, re-running the operation to process the next chunk of the data stream. Executing the STO cycle-by-cycle may also be as a Cycle-based STO (CSTO) to generate an unbounded sequence of results on each chunk of the data stream.

Further operations may include at 640 executing multiple STOs in parallel. Executing multiple STOs in parallel may be by using a task property specifying a number of threads for running the multiple STOs. Executing multiple STOs in parallel may also be using data grouping characteristics indicating how results of predecessor STOs are grouped for sending to successor STOs.

Further operations may include at 650 grouping data streams to inform the topology how to send the tuple.

The operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method of using an open station as a stream analysis operator container, the method is stored as instructions on a non-transitory computer readable media and executable by a processor for: packaging graph-structured stream transformations into a topology of a top-level dataflow process including stream transformation operators (STOs) on open stations, wherein the open stations each have a defined dataflow function having a higher level of abstraction with respect to the STOs contained in each open station such that the defined dataflow function of each open station encompass different types of specific STO application logic, facilitating the plugging in of specific types of STO application logic into the topology of the top-level dataflow process; and sending a tuple from one of the STOs to every other STO in the topology subscribed to a data stream of the tuple, and further comprising executing multiple STOs in parallel using a task property specifying a number of threads for running the multiple STOs.

2. The method of claim 1, wherein the data stream is an unbounded sequence of tuples.

3. The method of claim 1, further comprising executing an STO cycle-by-cycle to process the data stream chunk-by-chunk.

4. The method of claim 3, wherein processing the data stream chunk-by-chunk is by cutting the data stream into a sequence of chunks, with each chunk representing a bounded data set on which an operation is defined, and after processing a chunk of the data stream, re-running the operation to process the next chunk of the data stream.

5. The method of claim 3, wherein executing the STO cycle-by-cycle is as a Cycle-based STO (CSTO) to generate an unbounded sequence of results on each chunk of the data stream.

6. The method of claim 1, further comprising grouping data streams to inform the topology how to send the tuple.

7. The method of claim 1, wherein edges in the graph identify STOs subscribed to the data stream.

8. A data processing system with open station as a stream analysis operator container, comprising: a topology of graph-structured stream transformations representing a top-level dataflow process including stream transformation operators (STOs) on open stations, wherein the open stations each have a defined dataflow function having a higher level of abstraction with respect to the STOs contained in each open station such that the defined dataflow function of each open station encompass different types of specific STO application logic, facilitating the plugging in of specific types of STO application logic into the topology of the top-level dataflow process; and a processor for sending a tuple from one of the STOs to every other STO in the topology subscribed to a data stream of the tuple, and further comprising executing multiple STOs in parallel using data grouping characteristics indicating how results of predecessor STOs are grouped for sending to successor STOs.

9. The system of claim 8, wherein characteristics of the STOs are properties of the corresponding station objects.

10. The system of claim 8, wherein input/output characteristics of the STOs specify number of input tuples and output tuples the handled by the STOs.

11. The system of claim 8, wherein the STOs support one input/one output, one input/multiple outputs, multiple inputs/one output, and multiple inputs/multiple outputs.

12. The system of claim 8, wherein grouping characteristics of the STOs define how the topology sends tuples between STOs.

13. The system of claim 8, wherein the grouping characteristics comprise a shuffle grouping which sends tuples to a random task to evenly distribute processing the tuples across all consecutive downstream tasks.

14. The system of claim 8, wherein the grouping characteristics comprise a fields grouping which ensures tuples with same value go to a same task.

15. A data processing system with open station as a stream analysis operator container, comprising: a topology of graph-structured stream transformations into a topology of a top-level dataflow process including stream transformation operators (STOs) on open stations, wherein the open stations each have a defined dataflow function having a higher level of abstraction with respect to the STOs contained in each open station such that the defined dataflow function of each open station encompass different types of specific STO application logic, facilitating the plugging in of specific types of STO application logic into the topology of the top-level dataflow process; and a processor for sending a tuple from one of the STOs to every other STO in the topology subscribed to a data stream of the tuple, wherein invocation of the STOs follow a pattern for handling input and output, and further comprising executing multiple STOs in parallel using a task property specifying a number of threads for running the multiple STOs.

16. The system of claim 15, further comprising a scalar STO invocation pattern.

17. The system of claim 15, further comprising a table STO invocation pattern.

18. The system of claim 15, further comprising a set-in/set-out STO invocation pattern.

* * * * *